W. E. LAWN & J. A. RYAN.
AUTOMATIC STOP MECHANISM FOR CARS.
APPLICATION FILED JULY 9, 1914.
1,263,438.
Patented Apr. 23, 1918.
3 SHEETS—SHEET 3.
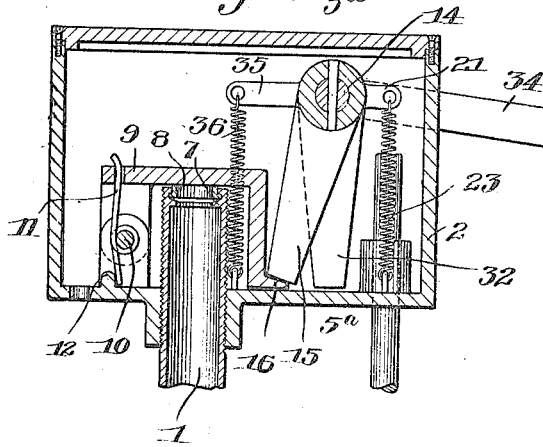
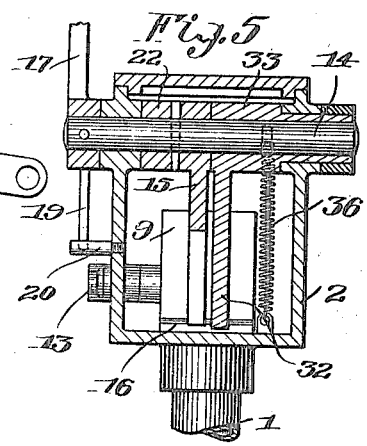
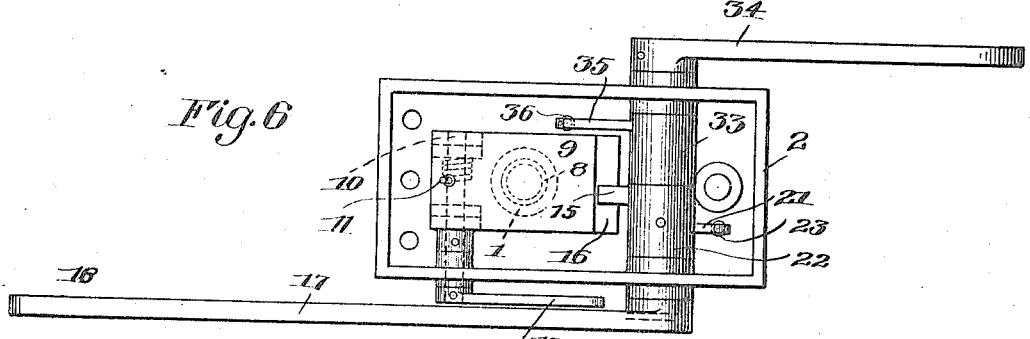
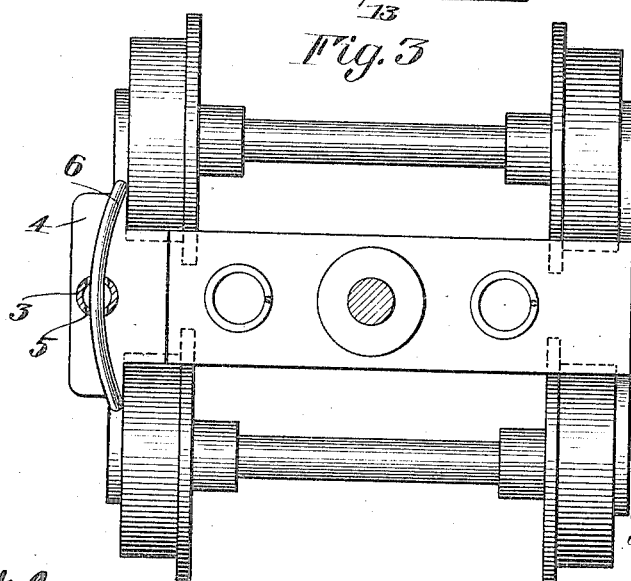
Inventors
William E. Lawn
James A. Ryan
Witnesses
Nelson H. Copp
H. E. Stonebraker
By Church & Rich
their Attorneys

UNITED STATES PATENT OFFICE.

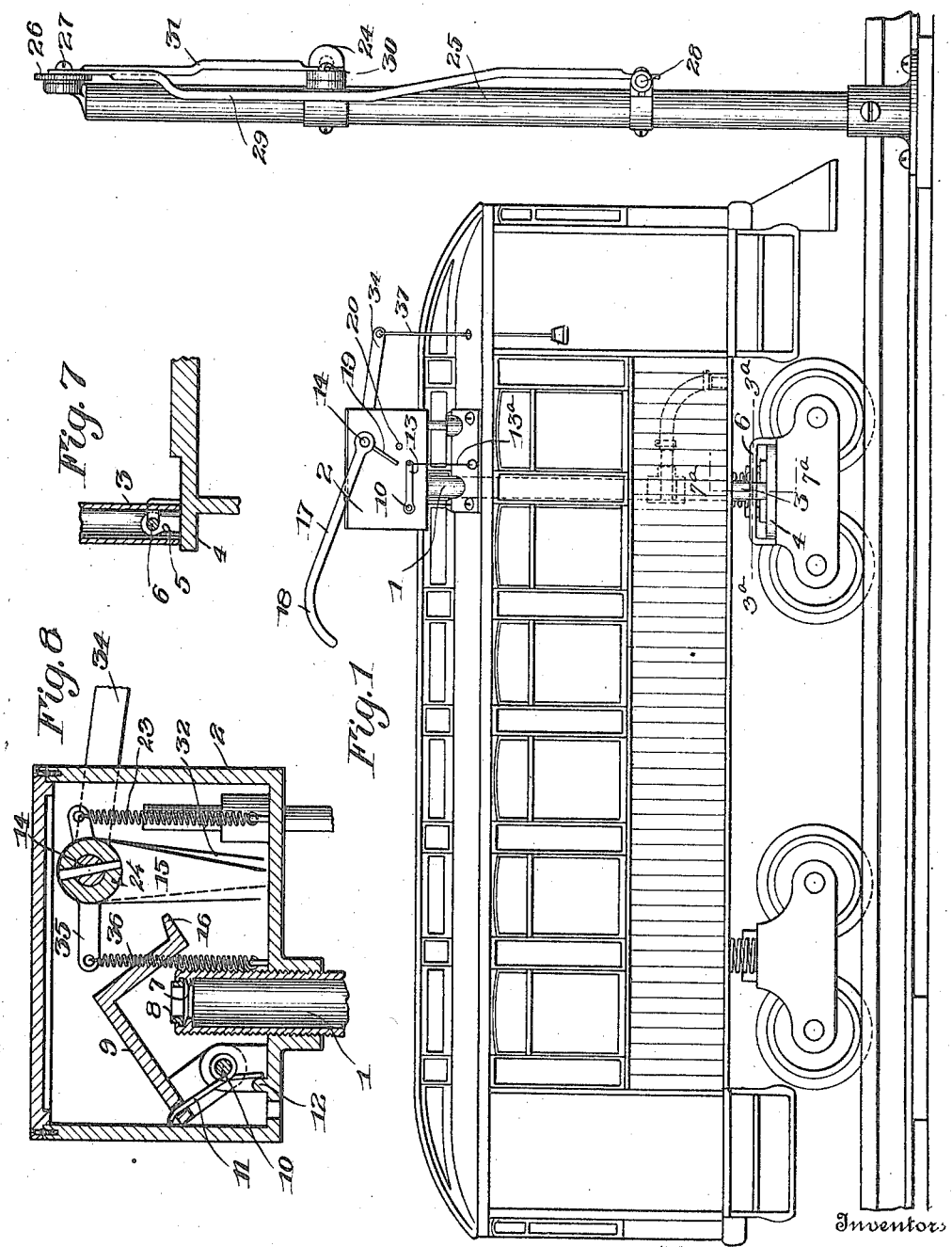

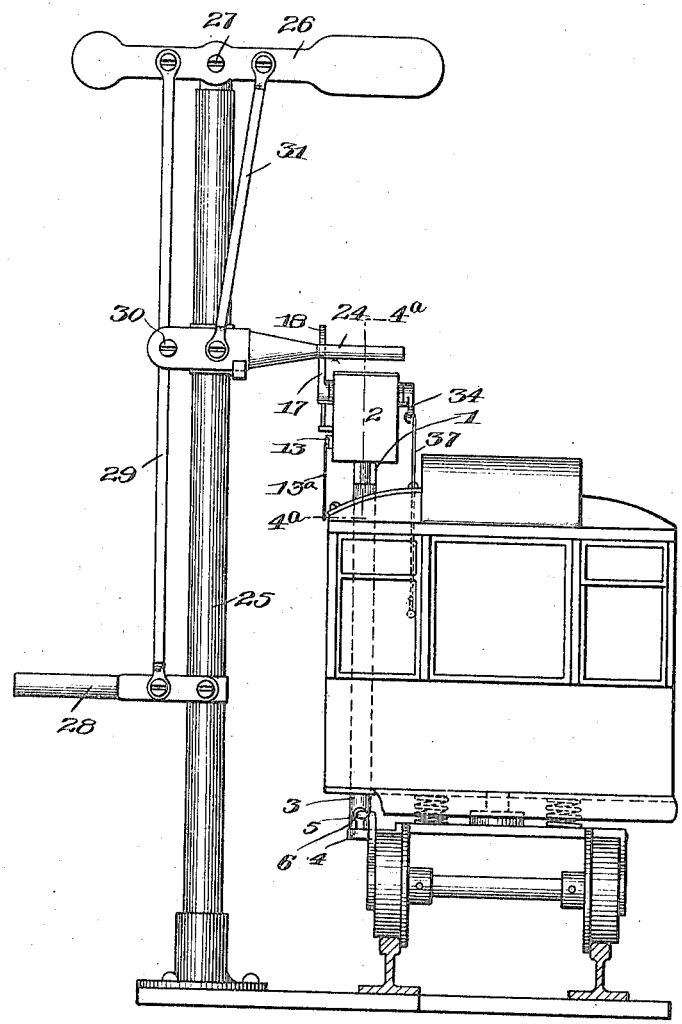

WILLIAM E. LAWN AND JAMES A. RYAN, OF ROCHESTER, NEW YORK, ASSIGNORS TO AUTOMATIC RAILROAD APPLIANCES CO., INC., OF ROCHESTER, NEW YORK, A CORPORATION OF NEW YORK.

AUTOMATIC STOP MECHANISM FOR CARS.

1,263,438.      Specification of Letters Patent.      Patented Apr. 23, 1918.

Application filed July 9, 1914. Serial No. 849,883.

*To all whom it may concern:*

Be it known that we, WILLIAM E. LAWN and JAMES A. RYAN, of Rochester, in the county of Monroe and State of New York, have invented certain new and useful Improvements in Automatic Stop Mechanisms for Cars; and we do hereby declare the following to be a full, clear, and exact description of the same, reference being had to the accompanying drawings, forming a part of this specification, and to the reference-numerals marked thereon.

Our invention relates to automatic stop mechanisms of the type in which a car or train is automatically brought to a standstill by the application of the brakes, upon the positioning of a roadside member that controls the operation of the brakes, and it has for its object to provide a novel and simple arrangement and construction of parts applicable to this purpose. A further purpose of the invention is to provide a structure that is more particularly designed for use in connection with trolley systems, and on trolley cars, where the conditions are somewhat different from steam operated trains. To these and other ends the invention consists in certan improvements and combinations of parts, all as will be hereinafter more fully described, the novel features being pointed out in the claims at the end of the specification.

In the drawings:

Figure 1 is a view in side elevation showing a portion of track with a semaphore stand, and a car in position, equipped with an embodiment of the invention;

Fig. 2 is an end elevation, with the tracks in section;

Fig. 3 is a sectional view on the line 3ª—3ª of Fig. 1;

Fig. 4 is a sectional view on the line 4ª—4ª of Fig. 2;

Fig. 5 is a sectional view on the line 5ª—5ª of Fig. 4;

Fig. 6 is a plan view of the parts shown in Fig. 4 with the top of the housing removed;

Fig. 7 is a sectional view on the line 7ª—7ª of Fig. 1, and

Fig. 8 is a view similar to Fig. 4 showing the valve in open position.

Similar reference characters throughout the several figures indicate the same parts.

In the embodiment shown, which is illustrative of the manner in which the invention may be carried out, the air-brake system of the car includes an exhaust pipe 1 that is suitably connected with the system, and extends vertically through the top of the car, being provided at its upper end with a housing or casing 2 which is preferably threaded thereon. At its lower end, the pipe 1 is mounted on a post 3 which rests freely upon the plate 4 of the truck frame, and is provided with openings 5 to receive the curved brace 6 that is attached to the truck frame. By mounting the parts in this manner, it will be seen that the exhaust pipe and controlling parts which are hereinafter to be described, are held on the truck against vertical movement, while the car body is permitted to move freely on the trucks. Furthermore, the curvature of the brace 6 and the openings provided in the post 3 permit the truck to turn with relation to the car body without disturbing the position of the post 3, which under such condition slides laterally over the surface of the plate 4. The pipe 1 is provided at its upper end with an interior flange 7, while 8 designates a rubber gasket held in a groove adjacent said flange and projecting beyond the upper end of the pipe. 9 is a valve adapted to engage the gasket 8 and close the pipe 1 in the manner shown in Fig. 4. The valve 9 is carried by the post 10, rotatably journaled in the housing, and is held in closed position in the manner that will presently be made clear. When the valve is closed, the pressure within the pipe 1 acts between the upper surface of the flange 7 and the lower surface of the gasket 8 to force the latter tightly against the valve and form a close joint. The valve 9 is operated to open position by means of a spring 11 surrounding the post 10 and having one end engaging an opening in the top of the valve while its other end engages the abutment 12 of the casing. When the valve is released, it is operated by the spring 11 to the position shown in Fig. 8, and to reset the valve the post 10 is provided with an arm 13 to which may be connected a suitable operating cord 13ª.

The valve is held in its closed position by a locking device that normally engages it, and is adapted to be moved to release the valve by a roadside member or trip that is movable into the path of the locking device. The locking device preferably embraces a spindle 14 that is suitably journaled in the walls of the housing and carries an arm 15 adapted to engage a flange 16 on the valve. Also carried by the spindle 14 is a lever 17 which extends upwardly as shown in Fig. 1 and is provided with a curved or cam portion 18 that is engaged by the roadside member. 19 is an arm carried by the lever 17 and adapted to engage a stationary stop 20 on the housing in order to limit the movement of the lever. 21 is a lug carried by a collar 22 fixed to the spindle 14, and 23 is a spring secured to said lug and to the housing, and acting to hold the spindle 14 normally in the position shown in Figs. 1 and 4, the arm 15 being in the position shown in Fig. 4 and holding the valve closed.

The roadside member or trip comprises an arm 24 pivotally mounted on the semaphore stand 25. 26 designates the semaphore pivoted at 27 and operated by a lever 28 which is connected to the semaphore by a rod 29. The arm 24 is pivoted at 30 to a bracket fixed to the stand 25. Said arm is connected to the semaphore 26 by means of a link 31 so that when the semaphore is moved to a horizontal position to indicate "danger", the roadside member will be similarly positioned horizontally to engage the lever 17 on the car, as shown in Fig. 2.

In the operation of the device, when the signal is moved to danger position, the roadside member is in the position shown in Fig. 2 so that as the car passes, the lever 17 is depressed. This moves the arm 15 away from engagement with the flange 16 and the valve is instantly opened by the action of the spring 11. The arm 15 is returned to its normal position after the car has passed, by the spring 23, and the valve 9 is re-set or closed by means of the lever 13 which is controlled by the motorman of the car and the closed valve is automatically locked by the arm.

In some cases, it may be desirable to pass a signal set at "danger", without stopping the car and to this end, we provide means for holding the controlling valve closed irrespective of the position of the lever 17 and arm 15. This supplemental means is preferably operated manually under the control of the motorman and may comprise an arm 32 adapted to engage the valve flange 16 and carried by a sleeve 33 which is loosely mounted on the spindle 14. Fixed upon the outer end of the sleeve 33 is a lever 34 by which it may be rotated to move the arm 32 into engagement with the flange 16. 35 is an extension of sleeve 33 to which is connected a spring 36 having its other end attached to the housing, and acting to hold the arm 32 normally disengaged from the valve as shown in Fig. 4. With the parts in this position, if it is desirable to prevent the opening operation of the controlling valve as the car passes the roadside member, the lever 34 is pulled downwardly, a suitable connection 37 being provided for this purpose, moving the arm 32 into engagement with the flange 16 of the valve. Thus, when the lever 17 is operated by the roadside member and the arm 15 moved out of engagement with the valve, the latter will nevertheless be held by the arm 32 until the car has passed and the arm 15 is returned to its normal position.

It will be evident from the aforesaid description that this invention in its broad aspects includes the combination with the exhaust pipe of a fluid-operated brake system of a railway car, of a valve adapted to close the pipe, a main locking device normally holding the valve closed and adapted for operation by a roadside member to then release the valve and allow it to open to assure application of the brakes, and a supplemental locking device normally dissociated from the valve and manually operative by an attendant on the car to temporarily hold the valve closed though the main locking device may have released the valve when operated by the roadside member. In the present embodiment of the invention, the main and supplemental valve locking devices have the form of rocking arms adapted to engage with and disengage from a portion of the valve, and spring means normally hold the main locking device or arm engaged with the valve, and spring means normally hold the supplemental locking device or arm disengaged from the valve. The invention also includes a support for the exhaust pipe normally resting on the car truck thereby permitting free vertical and lateral movements of the car body on its trucks without affecting the positions or adjustments of the exhaust pipe or its valve and the valve operating devices, and a laterally bracing guide for the exhaust pipe support held to the car truck and curved on a radius struck from the axis of lateral movement of the truck relatively to the car body.

We claim as our invention:

1. In automatic stop mechanism for railway cars having a fluid-operated brake system, the combination with a fluid exhaust pipe on the car, and a valve adapted to close the pipe, of a main locking device normally holding the valve closed and adapted for operation by a roadside member to then release the valve and allow it to open to assure application of the brakes, and a supplemental locking device normally dissociated from the valve and manually operative by an attendant on the car to temporarily hold the valve closed though the main locking device may have released the valve when operated by the roadside member.

2. In automatic stop mechanism for railway cars having a fluid-operated brake system, the combination with a fluid exhaust pipe on the car, and a valve adapted to close the pipe, of a main locking device normally holding the valve closed and adapted for operation by a roadside member to then release the valve and allow it to open to assure application of the brakes, and a supplemental locking device normally dissociated from the valve and manually operative by an attendant on the car to temporarily hold the valve closed though the main locking device may have released the valve when operated by the roadside member, said main and supplemental locking devices each including a rocking arm adapted to engage with and disengage from a portion of the valve.

3. In automatic stop mechanism for railway cars having a fluid-operated brake system, the combination with a fluid exhaust pipe on the car, and a valve adapted to close the pipe, of a main locking device normally holding the valve closed and adapted for operation by a roadside member to then release said valve and allow it to open to assure application of the brakes, and a supplemental locking device normally dissociated from the valve and manually operative by an attendant on the car to temporarily hold the valve closed though the main locking device may have released the valve when operated by the roadside member, said main and supplemental locking devices each including a rocking arm adapted to engage with and disengage from a portion of the valve, spring means normally holding the main locking arm engaged with the valve, and spring means normally holding the supplemental locking arm disengaged from the valve.

4. In automatic stop mechanism for railway cars having a fluid operated brake system, the combination with a fluid exhaust pipe on the car, and a hinged valve adapted to close the pipe, of a spindle, a rocking arm fixed to said spindle and constituting a main locking device normally holding the valve closed, a lever fixed to the spindle and adapted for automatic operation by a roadside member to then disengage the main locking arm from the valve and allow it to open to assure application of the brakes, a supplemental locking arm mounted loosely on the spindle and normally disengaged from the valve and means connected to said supplemental locking arm and manually operative by an attendant on the car to temporarily hold the valve closed by the supplemental arm though the main locking arm may have released the valve when operated by the roadside member.

5. In automatic stop mechanism for railway cars having a fluid operated brake system, the combination with a fluid exhaust pipe on the car, and a hinged valve adapted to close the pipe, of a spindle, a rocking arm fixed to said spindle and constituting a main locking device normally holding the valve closed, a lever fixed to the spindle and adapted for automatic operation by a roadside member to then disengage the main locking arm from the valve and allow it to open to assure application of the brakes, a supplemental locking arm mounted loosely on the spindle and normally disengaged from the valve, and means connected to said supplemental locking arm and manually operative by an attendant on the car to temporarily hold the valve closed by the supplemental arm though the main locking arm may have released the valve when operated by the roadside member, spring means normally holding the main locking arm engaged with the valve, and spring means normally holding the supplemental locking arm disengaged from the valve.

6. In automatic stop mechanism for railway cars having a fluid-operated brake system, the combination with a fluid exhaust pipe on the car, a valve adapted to close the pipe, means normally holding the valve closed, and means opening the valve to assure application of the brakes, of a support for the exhaust pipe normally resting on the car truck thereby permitting free vertical and lateral movements of the car body without affecting the positions or adjustments of the exhaust pipe or its valve or the valve operating devices.

7. In automatic stop mechanism for railway cars having a fluid-operated brake system, the combination with a fluid exhaust pipe on the car, a valve adapted to close the pipe, means normally holding the valve closed, and means opening the valve to assure application of the brakes, of a support for the exhaust pipe normally resting on the car truck thereby permitting free vertical and lateral movements of the car body without affecting the positions or adjustments of the exhaust pipe or its valve or the valve operating devices, and a laterally bracing guide for the exhaust pipe support held to the car truck and curved on a radius struck from the axis of lateral movement of the truck relatively to the car body.

8. In an automatic stop mechanism for cars, the combination with the exhaust pipe of an air brake system, of a pivoted valve normally closing said pipe, a locking device arranged to engage the valve to hold it closed comprising a collar mounted on a spindle and carrying an arm in contact with the valve, and means connected with the collar for normally holding the arm in contact position, means coöperating with the valve to pivotally move the same to an open position when released by said arm, a lever connected with the collar operable to move the arm out of engagement with the valve, a roadside member movable into the path of the lever, and supplemental means operable to hold the valve closed when said lever is engaged by the roadside member and the normal valve locking means is released.

WILLIAM E. LAWN.
JAMES A. RYAN.

Witnesses:
RUSSELL B. GRIFFITH,
H. E. STONEBRAKER.

Copies of this patent may be obtained for five cents each, by addressing the "Commissioner of Patents, Washington, D. C."